United States Patent
Meyerjürgens et al.

(10) Patent No.: US 12,344,761 B2
(45) Date of Patent: Jul. 1, 2025

(54) TWO-COMPONENT SOLVENT-BASED COATING COMPOSITION, METHOD FOR COATING A SUBSTRATE, COATED SUBSTRATE, AND USE OF SUCH COATING COMPOSITION FOR IMPROVING EROSION RESISTANCE

(71) Applicant: Akzo Nobel Coatings International B.V., Amsterdam (NL)

(72) Inventors: Andreas Meyerjürgens, Oldenburg (DE); Dirk Seeger, Oldenburg (DE); Igor Shishkov, Muenster (DE); Miriam Wickbold, Wildeshausen (DE)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 18/414,042

(22) Filed: Jan. 16, 2024

(65) Prior Publication Data

US 2024/0228826 A1    Jul. 11, 2024

Related U.S. Application Data

(62) Division of application No. 17/252,917, filed as application No. PCT/EP2019/067114 on Jun. 27, 2019, now abandoned.

(30) Foreign Application Priority Data

Jul. 2, 2018   (EP) ..................... 18181251

(51) Int. Cl.
| | | |
|---|---|---|
| C09D 175/06 | (2006.01) | |
| C08G 18/42 | (2006.01) | |
| C08G 18/62 | (2006.01) | |
| C08G 18/78 | (2006.01) | |
| C09D 7/20 | (2018.01) | |
| C09D 7/62 | (2018.01) | |

(52) U.S. Cl.
CPC ....... *C09D 175/06* (2013.01); *C08G 18/4238* (2013.01); *C08G 18/6225* (2013.01); *C08G 18/78* (2013.01); *C08G 18/7893* (2013.01); *C09D 7/20* (2018.01); *C09D 7/62* (2018.01)

(58) Field of Classification Search
CPC .... C09D 175/06; C08G 18/4266–4277; C08G 18/4211–4219; C08G 18/4238; C08G 18/4241
See application file for complete search history.

(56) References Cited

U.S. PATENT DOCUMENTS

| | | | |
|---|---|---|---|
| 5,387,642 A | 2/1995 | Blum et al. | |
| 5,710,209 A | 1/1998 | Blum et al. | |
| 6,610,777 B1 | 8/2003 | Anderson et al. | |
| 8,889,780 B2 | 11/2014 | Haberecht et al. | |
| 9,458,351 B2 | 10/2016 | Becker et al. | |
| 10,214,660 B2 | 2/2019 | Seeger et al. | |
| 2004/0151838 A1 | 8/2004 | Fenn et al. | |
| 2008/0268286 A1 | 10/2008 | Ishihara et al. | |
| 2010/0222505 A1* | 9/2010 | Moravek ............ | C08G 18/4063 525/450 |
| 2012/0093657 A1 | 4/2012 | Kallesoee et al. | |
| 2013/0210997 A1* | 8/2013 | Kaune ................ | C08G 18/4277 427/407.1 |
| 2018/0002566 A1 | 1/2018 | Seeger et al. | |
| 2021/0261816 A1 | 8/2021 | Meyerjürgens et al. | |

FOREIGN PATENT DOCUMENTS

| | | |
|---|---|---|
| CN | 105658747 | 6/2016 |
| WO | 2010122157 | 10/2010 |
| WO | 2012032113 | 3/2012 |
| WO | 2014196607 | 12/2014 |
| WO | 2015033624 | 3/2015 |
| WO | 2015120941 | 8/2015 |
| WO | 2016000845 | 1/2016 |
| WO | 2016128166 | 8/2016 |
| WO | 2017207521 | 12/2017 |
| WO | 2020007696 | 1/2020 |

OTHER PUBLICATIONS

"Examination Report," for Indian Patent Application No. 202017053958 mailed Jul. 20, 2022 (8 pages).
"Final Office Action," for U.S. Appl. No. 17/252,917 mailed Sep. 1, 2023 (11 pages).
"Final Office Action," for U.S. Appl. No. 17/252,917 mailed Sep. 28, 2022 (13 pages).
"First Office Action," for Chinese Patent Application No. 201980043194.4 mailed Aug. 23, 2021 (3 pages) English Translation Only.
"Non-Final Office Action," for U.S. Appl. No. 17/252,917 mailed Apr. 5, 2023 (16 pages).
"Non-Final Office Action," for U.S. Appl. No. 17/252,917 mailed Feb. 4, 2022 (13 pages).

(Continued)

*Primary Examiner* — Stephen E Rieth
(74) *Attorney, Agent, or Firm* — Pauly, DeVries Smith & Deffner LLC

(57) ABSTRACT

The present disclosure relates to a two-component, solvent-based coating composition comprising i) a base component comprising one or more polyesterdiols with a hydroxyl value in the range of from 150 to 500 mg KOH/g and one or more organosilane-modified inorganic fillers, and ii) a polyisocyanate curing component. Said composition can be formulated such that it has a viscosity suitable for spray application (low viscosity under high shear rate) and yield coatings with very good erosion resistance. The present disclosure further relates to a method for coating a substrate using said two-component coating composition, to a coated substrate obtainable by such method, and to use of such coating composition for improving erosion resistance of a substrate.

12 Claims, No Drawings

(56) References Cited

OTHER PUBLICATIONS

"Response to Final Office Action," for U.S. Appl. No. 17/252,917, filed on Jan. 26, 2023 (11 pages).
"Response to Non Final Office Action," for U.S. Appl. No. 17/252,917, filed on Jun. 22, 2022 (9 pages).
"Synolac 5085 Information," Arkema Coating Resins Feb. 2014 (2 pages).
Council Directive 1999/13/EC, Official Journal of the European Communities, Mar. 29, 1999, pp. 85/1-85/22.
European Search Report of Corresponding EP Application No. 18181251.2, dated Dec. 6, 2018.
International Preliminary Report on Patentability of Corresponding International Application No. PCT/EP2019/067114, mailed Sep. 11, 2020 (6 pages).
International Search Report and Written Opinion of corresponding International Application No. PCT/EP2019/067114, mailed Aug. 14, 2019 (14 pages).
Satas, et al. "Properties and Applications of Polyester Coatings," Chapter 7, Coatings Technology Handbook, Third Edition, 2006, Taylor & Francis Group (7 pages) with English Translation.

\* cited by examiner

TWO-COMPONENT SOLVENT-BASED COATING COMPOSITION, METHOD FOR COATING A SUBSTRATE, COATED SUBSTRATE, AND USE OF SUCH COATING COMPOSITION FOR IMPROVING EROSION RESISTANCE

CROSS-REFERENCE TO RELATED APPLICATIONS

This application is a Divisional of U.S. patent application Ser. No. 17/252,917, filed Dec. 16, 2020, which is a 35 U.S.C. § 371 national phase application of PCT Application No. PCT/EP2019/067114 (WO 2020/007696 A1), filed on Jun. 27, 2019, which claims the benefit of priority to EP Application No. 18181251.2, filed on Jul. 2, 2018, each of which is incorporated herein by reference in its entirety.

FIELD OF THE INVENTION

The present invention relates to a two-component, solvent-based coating composition, to a method for coating a substrate using such two-component coating composition, to a coated substrate obtainable by such method, and to use of such coating composition for improving erosion resistance of a substrate.

BACKGROUND OF THE INVENTION

In various application areas there is a need for protective coatings fulfilling high mechanical demands. Examples include surfaces of objects that are exposed to erosive substances at high speed, such as rotor blades of wind turbines or helicopters, ship screws, and transport vehicles such as aircraft, trains, automobiles, and ships. Erosion is typically caused by liquid or solid substances that impinge on object surfaces, such as airborne sand, rain or hail. Erosive influences are particularly strong in the edge regions of such objects.

Surfaces of objects are typically protected against wear, in particular against erosion, by applying to such surfaces a protective coating or multiple-layer coating system.

For effective erosion resistance, it is important to balance coating flexibility or elasticity and coating hardness. Excessive hardness and/or inadequate elasticity may be detrimental to effective erosion resistance.

There are various coating materials known for erosion protection of rotor blades of wind turbines. Polyurethane-based protective coatings are for example described in WO 2010/122157, WO 2012/032113, and WO 2016/000845.

Known coating compositions for erosion protection of rotor blades of wind turbines are often formulated free of organic solvents. Accordingly, such compositions have a high viscosity and cannot be satisfactorily applied to a substrate by spray application. Instead, brush or roller coating is to be used. There is a desire to use spray application, since it allows simpler and more controllable application of coating compositions.

Known erosion-resistant coating compositions that are suitable for spray application generally comprise a relatively large amount of organic solvents to control viscosity.

In WO2016/128166 is disclosed a solvent-based two-component coating composition comprising a base paint component with a polycarbonate diol, a hydroxyl-containing acrylate resin, polyester resin and/or polyester/acrylate resin with a hydroxyl number of 75 to 500 mg KOH/g, and at least one organosilane modified filler, and a polyisocyanate hardener component. The coating composition of WO2016/128166 has 100 to 350 g/L organic solvent and has a viscosity suitable for spray application.

The coating compositions of WO2016/128166 are, however, relatively expensive.

There is a need in the art for less expensive coating compositions that provide coatings with improved erosion resistance that can be applied by spray application, do not need the use of UV initiators and/or high temperature for curing and do not comprise large amounts of organic solvents.

SUMMARY OF THE INVENTION

It has now been found that a two-component, solvent-based coating composition comprising i) a base component comprising one or more polyesterdiols with a hydroxyl value in the range of from 150 to 500 mg KOH/g and one or more organosilane-modified inorganic fillers, and ii) a polyisocyanate curing component can be formulated such that it has a viscosity suitable for spray application (low viscosity under high shear rate) and yield coatings with very good erosion resistance.

Accordingly, in a first aspect the invention provides a two-component, solvent-based coating composition comprising:
i) a base component comprising
   (A) one or more polyester diols having a hydroxyl value in the range of from 150 to 500 mg KOH/g polyester diol;
   (B) optionally one or more hydroxyl-functional acrylate resins having a hydroxyl value in the range of from 75 to 500 mg KOH/g resin; and
   (C) one or more organosilane-modified inorganic fillers and
ii) a curing component comprising
   (D) one or more polyisocyanates,
in such amounts that the coating composition comprises:
   5 to 50 wt % of the one or more polyester diols (A)
   0 to 25 wt % of the one or more hydroxyl-functional acrylate resins (B);
   10 to 70 wt % of the one or more organosilane-modified inorganic fillers (C);
   5 to 40 wt % of the one or more polyisocyanates (D)
wherein the coating composition comprises one or more organic solvents in an amount in the range of from 5 to 35 wt %, and has a viscosity in the range of from 50 to 2,000 mPa·s, as measured by means of a rotary viscometer at a shear rate of 1,000 $s^{-1}$, a temperature of 23° C., 30 seconds after combining and mixing the base component and the curing component.

It is an advantage of the coating composition according to the invention that it is easy to apply, even on large objects such as rotor blades for wind turbines or aircrafts. The compositions can be applied by spray application and can be cured without using UV initiators or high temperature.

In a second aspect, the invention provides a method for coating a substrate comprising applying a two-component coating composition according to the first aspect of the invention to the substrate and allowing the applied coating composition to cure, preferably at a temperature of at most 80° C., more preferably at a temperature in the range of from 15° C. to 60° C.

In a third aspect, the invention provides a coated substrate obtainable by a method according to the second aspect of the invention.

The coating composition according to the invention, when applied to a substrate, can be cured without using high temperature whilst yielding coatings with excellent erosion resistance. The coating composition according to the invention is therefore particularly suitable for application to substrates that are subject to severe erosive forces, such as rotor blades.

Therefore, in a final aspect, the invention provides use of a coating composition according to the first aspect of the invention for improving erosion resistance of a substrate.

DETAILED DESCRIPTION OF THE INVENTION

The coating composition according to the invention is a two-component coating composition. It comprises a base component i) and a curing component ii). Components i) and ii) are prepared and stored separately, and are not combined until shortly before application of the coating composition. The pot life (the time during which a coating composition can be applied at a temperature in the range of from 15° C. to 25° C. without the viscosity increasing as a result of crosslinking reactions to the extent that application is no longer possible) depends on the constituents used, in particular polyesterdiol(s) (A), optional hydroxyl-functional acrylate resin(s) (B), and polyisocyanate(s) (D). Typically, the pot life of the coating composition is in the range of from 0.1 minutes to 10 minutes, preferably of from 0.5 minutes to 5 minutes.

Curing of the two-component coating composition occurs through chemical reaction of reactive functional groups of the binder constituents in the coating composition, in particular through reaction of the hydroxyl groups of the one or more polyesterdiols and the optional one or more OH-functional acrylate resins with the isocyanate groups of the one or more polyisocyanates. Through these crosslinking reactions a coating film, i.e. a cured coating layer, is formed. The term "binder" is used herein in relation to those constituents in the coating composition that are primarily responsible for film formation, in particular the polyesterdiol (s), the further resin(s), and the polyisocyanate(s). The polyisocyanate is also referred to as curing agent or crosslinking agent.

The coating composition according to the present disclosure comprises in its base component one or more polyesterdiols having a hydroxyl value in the range of from 150 to 500 mg KOH/g polyesterdiol.

A polyesterdiol is a polymer having a backbone comprising several ester groups, i.e. —C(O)O— groups with the carbon atom directly linked to a carbon atom, and two pendant or terminal hydroxyl groups.

The one or more polyesterdiols can suitably be prepared by esterification of one or more carboxylic diacids with one or more diols. Examples of suitable diols include ethylene glycol, propylene glycol, butylene glycol, 1,4-butanediol, 1,6-hexanediol, neopentyl glycol, and dimethylolcyclohexane. Examples of suitable carboxylic diacids include phthalic acid, isophthalic acid, terephthalic acid, tetrahydrophthalic acid, hexahydrophthalic acid, tetrachlorophthalic acid, cyclohexane dicarboxylic acid, succinic acid, adipic acid, azelaic acid, sebacic acid, maleic acid, fumaric acid, glutaric acid, and/or dimerized fatty acids.

The one or more polyesterdiols are preferably linear polyesterdiols. The one or more polyesterdiols are preferably hydroxyl-terminated polyesterdiols, more preferably hydroxyl-terminated polyesterdiols with a terminal hydroxyl group at both ends of a linear polyesterdiol.

The one or more polyesterdiols are preferably aliphatic polyesterdiols, i.e. without aromatic groups, since such groups exhibit significantly restricted UV resistance. Linear, aliphatic polyesterdiols are particularly preferred.

The one or more polyesterdiols have an OH number in the range of from 150 to 500 mg KOH/g, preferably of from 200 to 400 mg KOH/g, more preferably of from 250 to 350 mg KOH/g (measured according to DIN 53240).

In case of a hydroxyl-terminated polyesterdiol with a terminal hydroxyl group at both ends of a linear polyesterdiol, the OH number and the number-average molecular weight of the polyester diol are dependent on one another. The OH number thus provides information on the number-average molecular weight. A high number-average molecular weight goes hand in hand with a low OH number. The number-average molecular weight may vary widely, for example in the range of from 220 g/mole to 2,250 g/mole (measured by means of GPC analysis with THF (+0.1% acetic acid) as eluent (1 ml/min) on a styrene-divinylbenzene column combination, calibration using polystyrene standards).

Suitable polyesterdiols are commercially available, for example in the product line Synthoester™ (from Synthopol), Desmophen® (from Covestro), or Rokrapol® (from Kraemer).

The amount of the one or more polyesterdiols is in the range of from 5 to 50 wt %, more preferably of from 7.5 to 40 wt %, even more preferably of from 10 to 30 wt %, based on the total weight of the coating composition.

Preferably, the coating composition comprises one polyesterdiol (A).

The coating composition according to the present disclosure may comprise one or more hydroxyl-functional acrylate resins (B) in an amount up to 25 wt % based on the total weight of the coating composition. Preferably, the coating composition comprises one or more hydroxyl-functional acrylate resins in an amount in the range of from 1 to 20 wt %, more preferably of from 2 to 15 wt %. The one or more hydroxyl-functional acrylate resins (B) have a hydroxyl value in the range of from 75 to 500 mg KOH/g resin, preferably of from 100 to 450 mg KOH/g, more preferably of from 175 to 400 mg KOH/g, even more preferably of from 250 to 350 mg KOH/g.

Acrylate resins, also referred to as poly(meth)acrylate resins, are well known polymeric organic compounds obtained by reacting acrylate and/or methacrylate monomers.

Examples of acrylate and methacrylate monomers that can suitably be used to obtain acrylate resin(s) (B) are alkyl (meth)acrylates and cycloalkyl (meth)acrylates, such as ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cyclopentyl acrylate, cyclopentyl methacrylate, isobornyl acrylate, isobornyl methacrylate, cyclohexyl acrylate and cyclohexyl methacrylate.

The one or more acrylate resins (B) contain hydroxyl groups. Such hydroxyl groups are typically introduced by incorporation into the polymer structure of acrylate and methacrylate monomers with hydroxyl groups. Suitable hydroxyl-containing monomers include hydroxyalkyl (meth)acrylates, for example 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, especially 4-hydroxybutyl acrylate and/or 4-hydroxybutyl methacrylate.

Suitable hydroxyl-functional acrylate resins with a hydroxyl value in the range of from 75 to 500 mg KOH/g resin are commercially available, for example under the trade names WorléeCryl (from Worlée) and Synthalat (from Synthpol).

Further ethylenically unsaturated monomers may be used to prepare the acrylate resins, for example: vinylaromatic hydrocarbons such as vinyltoluene, alpha-methylstyrene and styrene; amides or nitriles of acrylic acid or methacrylic acid; vinyl esters or vinyl ethers; and in particular acrylic acid and methacrylic acid.

Preferably, the coating composition comprises at most one hydroxyl-functional acrylate resin (B).

Preferably, the base component does not comprise any resins, or binder constituents, other than the polyester diol(s) (A) and any hydroxyl-functional acrylate resin(s) (B). Preferably, the coating composition does not comprise any binder constituents, other than the polyester diol(s) (A), any hydroxyl-functional acrylate resin(s) (B), and the polyisocyanate(s) (D).

The coating composition according to the invention comprises one or more organosilane-modified inorganic fillers (C). The inorganic filler to be modified may be any inorganic filler known to be suitable for coating compositions. Such fillers include various substances, typically in granular or powder form, used to achieve particular physical properties of coating compositions. Suitable inorganic fillers include: carbonates such as calcium carbonate, dolomite or barium carbonate; sulfates such as calcium sulfate and barium sulfate; silicates and optionally phyllosilicates such as talc, pyrophyllite, mica, kaolin, feldspar, precipitated calcium, aluminum, calcium/aluminum, sodium/aluminum silicates, mullite, wollastonite, nepheline such as nepheline syenite, and silicon dioxide such as quartz and cristobalite. For the purpose of the present invention, the group of silicates includes silicon dioxide. Other suitable inorganic fillers are precipitated silicas or fumed silicas, and metal oxides such as aluminum hydroxide and magnesium hydroxide. Preferably, the inorganic filler is a silicate.

The one or more inorganic fillers (C) are modified with organosilane. The inorganic filler to be modified serves as substrate to which an organosilane is applied under typical conditions for physisorption and/or chemisorption. Through the addition of an organosilane, the surface of the inorganic filler is hydrophobized. Thus, the compatibility of the filler with the hydrophobic polymer matrix of the coating composition is increased by improving physical adsorption and optionally chemical reaction to the other constituents of the coating composition. As a result, the filler can more effectively improve mechanical resistance of the coating deposited from the coating composition.

Modification of inorganic fillers with organosilane is known in the art. Such modification process and organosilanes suitable for such modification are for example described in detail in WO 2017/207521 (page 9, line 23 to page 12, line 12), incorporated herein by reference. Preferably, the inorganic filler is modified with an organosilane containing an epoxide or amino group, more preferably an organosilane containing an organic radical containing an epoxide group or an amino group bonded to the silicon atom via a carbon atom. By incorporating such epoxide or amino groups in the inorganic filler, the polarity of the filler is tuned and physical adsorption to other components of the coating composition is more effective. Moreover, upon curing of the coating composition, the thus-modified inorganic filler can react with the functional groups of the polyesterdiol(s), the optional OH-functional acrylic resin(s) and/or of the polyisocyanate(s). Therewith, the filler can be incorporated more effectively in the polymer network that is formed.

Organosilane-modified inorganic fillers are commercially available, for example under the trade names Tremin, Treminex, Tremica or Silbond (from HPF The Mineral Engineers).

The particle size of the one or more organosilane-modified inorganic fillers is not in itself a critical parameter and may be in the range common for fillers, typically of from a few micrometers to a few hundreds of micrometers. Preferably, the average particle size (D50) is in the range of from 0.1 μm to 100 μm, more preferably of from 1 μm to 50 μm, as measured by laser diffraction in accordance with ISO 13320:2009.

The amount of the one or more organosilane-modified inorganic fillers (C) in the coating composition is in range of from 10 to 70 wt %, preferably of from 15 to 60 wt %, more preferably of from 20 to 50 wt %, based on the total weight of the coating composition.

Preferably, the coating composition comprises less than 10 wt %, more preferably less than 3 wt %, even more preferably less than 1 wt % of inorganic fillers other than organosilane-modified inorganic fillers (C). Still more preferably, the coating composition is free of inorganic fillers other than the one or more organosilane-modified inorganic fillers (C). The term 'inorganic filler' herein does not include inorganic color pigments, inorganic additives, or inorganic molecular sieves.

The two-component coating composition comprises one or more polyisocyanates (D) in curing component ii).

Polyisocyanates are organic compounds having on average more than one isocyanate groups per molecule and are known in the art. The one or more polyisocyanates (D) may be aliphatic or aromatic.

The one or more polyisocyanates may be modified polyisocyanates, such as for example polyether-modified and/or polyester-modified polyisocyanates. The isocyanate groups in these components may be free or may be blocked with known blocking agents. Preferably the isocyanate groups are non-blocked, i.e. free, isocyanate groups.

Di-isocyanates, and dimers or trimers of di-isocyanates, such as uretdiones, tri-isocyanurates, or biurets, are preferred polyisocyanates. Suitable di-isocyanates include hexamethylene di-isocyanate, octamethylene di-isocyanate, decamethylene di-isocyanate, dodecamethylene di-isocyanate, tetradecamethylene di-isocyanate, trimethylhexane di-isocyanate, tetramethylhexane di-isocyanate, isophorone di-isocyanate (IPDI), 2-isocyanatopropylcyclohexyl isocyanate, dicyclohexylmethane 2,4'-di-isocyanate, dicyclohexylmethane 4,4'-di-isocyanate, 1,4- or 1,3-bis(isocyanatomethyl)cyclohexane, 1,4- or 1,3- or 1,2-di-isocyanatocyclohexane, 2,4- or 2,6-di-isocyanato-1-methylcyclohexane, any C2-C18 alkylated derivative thereof, or a mixture of two or more thereof.

Preferred di-isocyanates are aliphatic di-isocyanates, more preferably 1,6-hexamethylene di-isocyanate (HDI), 1,3-cyclohexyl di-isocyanate, 1,4-cyclohexyl di-isocyanate (CHDI), 2,2,4- and/or 2,4,4-trimethyl-1,6-hexamethylene di-isocyanate, dodecamethylene di-isocyanate, isophorone di-isocyanate (IPDI), and mixtures thereof.

Uretdiones, tri-isocyanurates, or biurets of di-isocyanates, preferably of aliphatic di-isocyanates, more preferably of hexamethylene di-isocyanate (HDI), isophorone di-isocyanate (IPDI), or mixtures thereof, are preferred. Particularly preferred is a biuret or tri-isocyanurate of hexamethylene di-isocyanate.

The one or more polyisocyanatse preferably have an isocyanate content in the range of from 10% to 25%, more preferably of from 16% to 24%, even more preferably of from 20% to 23.5%. The isocyanate content is determined in accordance with DIN EN ISO 11909 by reacting the one or more polyisocyanates with excess dibutylamine and back-titrating with hydrochloric acid against bromophenol blue.

The amount of the one or more polyisocyanates (D) is in the range of from 5 to 40 wt %, preferably of from 10 to 30 wt %, more preferably of from 12 to 25 wt %, based on the total weight of the coating composition.

Preferably, the coating composition comprises one polyisocyanate (D).

Preferably, the total amount of components (A), (B), (C), and (D) in the coating composition is at least 40 wt %, more preferably at least 50 wt %, based on the total weight of the coating composition.

Preferably, the composition comprises one polyester diol (A), at most one OH-functional acrylic resin (B), one or more organosilane-modified inorganic fillers (C), one polyisocyanate (D), and is free of any inorganic fillers other than the one or more organosilane-modified inorganic fillers (C).

The ratio of the total molar amount of hydroxyl groups in polyesterdiol(s) (A) and OH-functional acrylic resin(s) (B) to the molar amount of isocyanate groups in polyisocyanate(s) (D) is preferably in the range of from 1.0:0.9 to 1.0:1.5.

The coating composition is solvent-based and comprises one or more organic solvents in an amount in the range of from 5 to 35 wt %, preferably of from 7.5 to 25 wt %, more preferably of from 10 to 20 wt %, based on the total weight of the coating composition.

Reference herein to "organic solvent" is to organic solvent as specified in Directive 1999/13/EC of the Council of Mar. 11, 1999 (published in the Official Journal of the European Union on Mar. 29, 1999). In the Directive an organic solvent is specified as a "volatile organic compound" which is used alone or in combination with other agents, and without undergoing a chemical change, to dissolve raw materials, products or waste materials, or is used as a cleaning agent to dissolve contaminants, or as a dissolver, or as a dispersion medium, or as a viscosity adjuster, or as a surface tension adjuster, or a plasticizer, or as a preservative. The aforementioned directive defines a "volatile organic compound" as an organic compound having, at 293.15 K, a vapour pressure of 0.01 kPa or more, or having a corresponding volatility under the particular conditions of use.

Examples of suitable organic solvents include: aliphatic and/or aromatic hydrocarbons such as toluene, xylene, solvent naphtha, Solvesso 100, or Hydrosol® (from ARAL); ketones, such as acetone, methyl ethyl ketone or methyl amyl ketone; esters, such as ethyl acetate, butyl acetate, butyl glycol acetate, 3-methoxy-n-butyl acetate, pentyl acetate, methoxypropyl acetate or ethyl ethoxypropionate; ethers such as dipropylene glycol methyl ether; alcohols; and hydrochlorocarbons.

The amount of organic solvent is chosen such that the coating composition of the present disclosure has a content of volatile organic compounds (VOC) of at most 350 g/L, preferably of from 100 to 325 g/L, more preferably of from 150 to 300 g/L.

Particularly preferred organic solvents are aprotic solvents, such as esters, ketones or hydrocarbons. Examples of particularly suitable esters are esters of acetic acid such as C1-4-alkyl esters of acetic acid and C1-4-alkoxyalkyl esters of acetic acid, butyl acetate, 1- and 2-methoxypropyl acetate, butyl glycol acetate and 3-methoxy-n-butyl acetate. Examples of particularly suitable ketones are methyl isobutyl ketone, or diketones such as acetylacetone. Examples of particularly suitable hydrocarbon solvents are Shellsol A, or alkylbenzenes such as xylene and toluene.

The coating composition preferably contains no or only minor amounts of water. Preferably, the coating composition contains less than 1.0 wt %, more preferably less than 0.2 wt %, even more preferably less than 0.01 wt % of water, based on the total weight of the coating composition. Water is preferably not explicitly added, e.g. to adjust the viscosity of the coating composition, but merely present, if at all, in small amounts as part of typical coating additives.

In a preferred embodiment, the coating composition comprises:
  10 to 30 wt % of the one or more polyester diols (A);
  0 to 25 wt % of the one or more hydroxyl-functional acrylate resins (B);
  20 to 50 wt % of the one or more organosilane-modified inorganic fillers (C);
  10 to 30 wt % of the one or more polyisocyanates (D); and
  7.5 to 25 wt % of one or more organic solvents.

The coating composition may comprise, typically in its base component i), further components generally known as constituents for coating compositions, such as color pigments, catalysts or additives.

The coating composition may comprise a molecular sieve or a plurality of molecular sieves. Reference herein to molecular sieves is to natural or synthetic zeolites with a relatively large internal surface area (about 600 to 700 m$^2$/g) and uniform pore diameter. Suitable molecular sieves have a pore size in the range of from 2 to 10 angstroms, preferably of from 3 to 4 angstroms. For example, high-porosity aluminium silicates with a pore size of 3 angstroms may be used. Preferably, the coating composition comprises a molecular sieve in an amount up to 20 wt %, preferably in the range of from 1 to 15 wt %, more preferably in the range of from 2 to 10 wt %, based on the total weight of the coating composition.

The coating composition may comprise dyes, color pigments, or further catalysts. Color pigments, including white pigments, may be present in customary amounts; typically in the range of from 8 wt % to 30 wt %, based on the total weight of the coating composition.

The coating composition may comprise one or more catalysts for the catalysis of the reaction of hydroxyl groups with isocyanate groups. The coating composition preferably contains 0.01 to 2 wt %, based on the total weight of the coating composition, of such catalyst. Suitable catalysts are the known in the art and include metal catalysts such as tin, molybdenum, zirconium or zinc catalysts and amine catalysts such as 2-(2-dimethylaminoethoxy) ethanol. Particularly suitable catalysts are tin compounds such as dialkyltin dicarboxylates, in particular dimethyltin dilaurate or dibutyltin dilaurate.

The coating composition may comprise typical additives such as antioxidants, de-aerating agents, wetting agents, dispersants, adhesion promoters, rheology modifiers such as thickeners, waxes and wax-like compounds, biocides, matting agents, radical scavengers, light stabilizers or flame retardants. Additives may be present in customary amounts, typically in the range of from 0.1 to 10 wt %, based on the total weight of the coating composition.

The density of the coating composition is preferably in the range from 1,100 to 1,700 g/L, more preferably of from 1,200 to 1,650 g/L, even more preferably of from 1,300 to 1,600 g/L.

The solids content of the coating composition according to the present disclosure is preferably in the range of from 70% to 95 wt %, more preferably of from 75% to 92.5%, even more preferably of from 80 to 90 wt %.

By solids content (non-volatile fraction) is meant the weight fraction which remains as a residue on evaporation under specified conditions. In the present application, the solids content is determined according to DIN EN ISO 3251. This is done by evaporating the composition at 130° C. for 60 minutes.

The coating composition of the present disclosure has a viscosity in the range of from 50 to 2,000 mPa·s as measured by means of a rotary viscometer at a shear rate of 1,000 $s^{-1}$, a temperature of 23° C., 30 seconds after combining and mixing the base component and the curing component. Preferably the coating composition has, at a shear rate 1,000 $s^{-1}$, a viscosity in the range of from 50 to 2,000 mPa·s, more preferably in the range of from 200 to 1,000 mPa·s (measured as indicated hereinbefore). The measurement by means of a rotary viscometer is carried out according to DIN 53019.

Thus, the coating composition has a relatively low viscosity at high shear rate and can suitably be applied to a substrate via spray application. At spray application, a coating composition is subjected to high shear rate when leaving the spray nozzle.

Preferably, the coating composition has a viscosity in the range of from 1,000 to 10,000 mPa·s at a shear rate of 1 $s^{-1}$, and the coating composition has a viscosity at a shear rate of 1,000 $s^{-1}$ that is 2 to 20 times lower than its viscosity at a shear rate of 1 $s^{-1}$, wherein the viscosity is measured by means of a rotary viscometer, at a temperature of 23° C., 30 seconds after combining and mixing the base component and the curing component (determined according to DIN 53019). More preferably, the viscosity at a shear rate of 1 $s^{-1}$ is in the range of from 1,500 to 7,500 mPa·s and a factor 5 to 15 lower at a shear rate of 1,000 $s^{-1}$. Even more preferably, the viscosity at a shear rate of 1 $s^{-1}$ is in the range of from 2,500 to 5,000 mPa·s and a factor 6 to 10 lower at a shear rate of 1,000 $s^{-1}$.

The coating composition has a low viscosity during spray application, when high shear conditions exist, so that it can reasonably be atomized. Immediately after application, when hardly any or low shear forces are exercised, the viscosity is sufficiently high to provide sag-resistance and avoiding the coating to drip off the substrate.

The invention further relates to method for coating a substrate comprising applying the two-component coating composition according to the first aspect of the invention to the substrate and allowing the applied coating composition to cure.

The coating composition may be applied by any technique known in the art such as spraying, roller coating, brushing, pouring, or by cartridge application. Preferably, the coating composition is applied by spray application. Spray application is well known in the art and includes techniques such as compressed air spraying, airless spraying, rotary bell spray application, electrostatic spray application, optionally combined with hot spray application, and air induction spraying. As already described, the coating composition of the invention is particularly suitable for spray application because of its specific rheological properties, in particular its low viscosity under high shear stress.

Following application, the applied coating is allowed to cure, preferably at a temperature of at most 80° C., more preferably at most 60° C., even more preferably at a temperature in the range of from 15 to 60 ° C., still more preferably of from 15 to 50° C.

The time needed for complete curing varies with the curing temperature. Typical curing times are in the range of from 30 minutes to 10 days. Curing may for example require 30 minutes at a curing temperature in the range of from 40° C. to 60° C., or 7 days at a curing temperature in the range of from 15 to 25° C.

The cured coating suitably has a dry film thickness in the range of from 100 to 500 μm, preferably of from 150 to 400 μm.

The substrate may be any suitable substrate. The substrate preferably is a metal substrate, such as steel or aluminium, or a plastic substrate, more preferably a fiber-reinforced plastic substrate. Epoxy resin-based plastic substrates, in particular fiber-reinforced epoxy resin-based plastic substrates, are particularly preferred. Suitable fibers for reinforcement are glass fiber, aramid fiber and/or carbon fiber, or natural fibers, such as hemp or sisal. Preferred substrates are glass fiber-reinforced epoxy resin based plastic substrates. The substrate may have any desired size or shape.

The coating composition according to the invention is advantageously applied to very large substrates, such as rotor blades, since it can suitably be applied by spray application followed by curing at room temperature (e.g. 15 to 25° C.), i.e. without the need for heat supply. Due to the very good erosion resistance of the resulting coatings, the coating composition is preferably applied to a substrate that will be exposed to rain or sand erosion, such as rotor blades of wind turbines or helicopters, ship screws, air vehicles such as airplanes. Particularly suitable substrates are rotor blades of wind turbines, and surfaces of airplanes.

Due to its high erosion resistance, the coating composition according to the invention is preferably applied as a topcoat. The substrate to which it is applied may already comprise one or more coating layers (e.g. primer coating or surfacer coating) before applying the coating composition according to the first aspect of the invention as a topcoat layer.

The invention further relates to a coated substrate obtainable by a method according to the second aspect of the invention, i.e. to which a coating composition according to the first aspect of the invention has been applied followed by curing. Preferably the coated substrate comprises multiple coating layers and the coating composition according to the first aspect of the invention provides a topcoat layer.

The invention will be further illustrated by means of the following non-limiting examples.

EXAMPLES

1. Test Methods 1.1 General Remarks

For laboratory determination of erosion resistance, a variety of equipment can be used that moves the coated substrate to be tested through an erosion medium or wherein the substrate is fixed and erosion medium flows around it. A stationary test specimen can for example be tested using high-pressure water jetting as typically used for water jet cutting. The erosion effect is controlled by water pressure, distance to the test specimen, and type and size of the nozzles. The effect can be intensified by the use of sand, corundum or silicon carbide. Alternatively, sand blasting or steam blasting may be used, wherein pressure, nozzle size, and distance to the test specimen may likewise be used to control the erosion effect and adapt it to realistic conditions.

In rain erosion tests for moving test specimen, the coated substrate is attached to a rotor or a disk and is radially moved through a curtain of water droplets or of mixtures of water droplets and salt or sand. The most common test scenario used in the wind energy industry operates with velocities of 140 m/s and a rain volume of 30 l/h. In the airplane industry, velocities of up to 220 m/s are used, with a comparable rain volume. The test for rain erosion resistance may be carried out in accordance with ASTM G 73.

1.2 Test Conditions

Rain erosion resistance was tested in accordance with ASTM G 73. Test specimens were spun with a velocity of 140 m/s through a curtain of water droplets. The rain volume was kept constant at 30 l/h. The droplet size of the applied "rain" was on average 5-6 mm. The test was carried out at a temperature of 20 to 25° C. The test specimens were visually evaluated at time intervals of 15 minutes. The erosion resistance corresponds to the time until the substrate was visible through the coating.

2. Preparation of Coating Compositions and Coated Substrates

Base components and curing components for various coating compositions (I=inventive; C=comparative) were prepared by combining the respective constituents and homogeneously mixing them in a dissolver (see Table 1 for the composition of the coating compositions). For each coating composition, the base component and the curing component were homogeneously mixed in the proportions indicated in Table 1.

The viscosity of the coating compositions prepared was determined 30 seconds after combining and mixing the base component i) and curing component ii), by means of rotary viscometer (HAAKE RheoStress 600) under a shearing rate of $1\ s^{-1}$ and under a shear rate of $1,000\ s^{-1}$, at a temperature of 23° C. (DIN 53019).

Immediately after preparation, the coating compositions were applied by airmix spray application to a glass fiber-reinforced epoxy resin based test specimen already coated with a commercially available polyurea-based pore filler. Curing took place by storage at 20 to 25° C. for 7 days. The dry film thickness of the cured coating was 300 micrometers.

The rain erosion resistance of the multiple coat (pore filler coat and topcoat) thus formed was investigated. The results are shown in Table 2.

TABLE 1

Composition and characteristics of coating compositions

| Constituent | Wt % in component i) or ii) (g/g) | | | | | | |
|---|---|---|---|---|---|---|---|
| | I1 | I2 | I3 | I4 | I5 | C1 | C2 |
| Base component | | | | | | | |
| Linear, aliphatic polyesterdiol; terminal OH groups; OH value 270 | 22.75 | 22.75 | 22.75 | 16.0 | 17.0 | | |
| Linear, aliphatic polyesterdiol; terminal OH groups; OH value 100 | | | | | | 23.0 | |
| Linear, aliphatic polycarbonatediol; terminal OH groups; OH value 270 | | | | | | | 17.0 |
| OH-functional polyacrylate*; OH value 260 | — | — | — | — | 6.0 | | 6.0 |
| Thixotrope | 0.7 | 2 | 0.7 | 2.4 | 0.7 | 0.7 | 0.7 |
| Aminosilane-modified wollastonite | 31 | 33 | 26 | 44.9 | 26 | 26 | 31 |
| Molecular sieve | 3.7 | 3.7 | 3.7 | 3.7 | 3.7 | 3.7 | 3.7 |
| Additive in organic solvent | 4.0 | 4.0 | 4.1 | 4.1 | 4.1 | 4.1 | 4.0 |
| White pigment | 15.4 | — | 21.4 | 13.86 | 21.4 | 21.4 | 15.4 |
| Red pigment | — | 3 | — | — | | | — |
| Yellow pigment | | 6.7 | | | | | |
| Red pigment (metal oxide) | | | 0.003 | | 0.003 | 0.003 | |
| Pigment paste (black) | 0.6 | | 0.002 | 0.5 | 0.002 | 0.002 | 0.6 |
| Violet pigment | | 0.1 | | | | | |
| Yellow pigment (metal oxide) | 0.8 | — | 0.045 | 0.7 | 0.045 | 0.045 | 0.8 |
| Matting agent | 2.8 | 0.35 | 2.8 | — | 2.8 | 2.8 | 2.8 |
| Organic solvent ** | 18.18 | 24.33 | 18.18 | 13.77 | 18.18 | 18.18 | 18.0 |
| Catalyst (tin-based) | 0.07 | 0.07 | 0.07 | 0.07 | 0.07 | 0.07 | 0.07 |
| Total | 100 | 100 | 100 | 100 | 100 | 100 | 100 |
| Curing component | | | | | | | |
| Tri-isocyanurate of HDI; isocyanate content 23% | 23.3 | 23.3 | 23.3 | 16.7 | 23.3 | 10.0 | 23.3 |
| Total | 123.3 | 123.3 | 123.3 | 116.7 | 123.3 | 110 | 123.3 |
| Density (g/mL) | 1.4 | 1.4 | 1.4 | 1.6 | 1.4 | 1.4 | 1.4 |
| VOC (g/l) | 240 | 294 | 240 | 227 | 240 | 230 | 240 |
| Viscosity at $1,000\ s^{-1}$ (mPa · s) | 1,000 | 1,500 | 1,100 | 2,000 | 1,900 | 1,800 | 1,200 |
| Viscosity at $1\ s^{-1}$ (mPa · s) | 4,800 | 7,100 | 3,800 | 6,200 | 6,000 | 7,200 | 3,780 |

*Synthalat AT-H 2104
** mixture of butylglycol acetate (9.5 wt %) and butyl acetate (90.5 wt %)

TABLE 2

| Rain erosion resistance of coated substrates | | | | | | |
| --- | --- | --- | --- | --- | --- | --- |
| | I1 | I2 | I3 | I4 | I5 | C1 | C2 |
| Rain erosion resistance (minutes) | >300 | >300 | >300 | >600 | >300 | 50 | 240 |

The invention claimed is:

1. A method for coating a substrate selected from rotor blades of wind turbines, rotor blades of helicopters, ship screws and aircraft, the method comprising:
   applying a two-component solvent-based coating composition to the substrate; and
   allowing the applied coating composition to cure,
   wherein the two-component, solvent-based coating composition comprises
   i) a base component comprising
   (A) one or more polyester diols having a hydroxyl value in the range of from 150 to 500 mg KOH/g polyester diol;
   (B) optionally one or more hydroxyl-functional acrylate resins having a hydroxyl value in the range of from 75 to 500 mg KOH/g resin; and
   (C) one or more organosilane-modified inorganic fillers; and
   ii) a curing component comprising
   (D) one or more polyisocyanates,
   in such amounts that the coating composition comprises:
   5 to 50 wt % of the one or more polyester diols (A);
   0 to 25 wt % of the one or more hydroxyl-functional acrylate resins (B);
   10 to 70 wt % of the one or more organosilane-modified inorganic fillers (C);
   5 to 40 wt % of the one or more polyisocyanates (D);
   wherein the base component comprises no resins other than the one or more polyester diols (A) and any hydroxyl-functional acrylate resins (B);
   the one or more polyisocyanates (D) are selected from trimers of di-isocyanates;
   the coating composition comprises one or more organic solvents in an amount in the range of from 5 to 35 wt %; and
   the coating composition has a viscosity in the range of from 50 to 2,000 mPa·s as measured by means of a rotary viscometer at a shear rate of 1000 s$^{-1}$ and a temperature of 23° C., 30 seconds after combining and mixing the base component and the curing component.

2. A method according to claim 1 wherein the two-component coating composition is applied to the substrate by spray application.

3. A method according to claim 1, wherein the substrate is a substrate comprising one or more coating layers and the two-component coating composition is applied as a topcoat layer.

4. The method of claim 1, further comprising improving erosion resistance of the substrate.

5. The method of claim 1, further comprising allowing the applied coating composition to cure at a temperature of at most 80° C.

6. The method of claim 1, wherein the polyester diol of (A) is prepared by esterification of one or more carboxylic diacids with one or more diols.

7. The method of claim 6, wherein the one or more carboxylic diacids are selected from phthalic acid, isophthalic acid, terephthalic acid, tetrahydrophthalic acid, hexahydrophthalic acid, tetrachlorophthalic acid, cyclohexane dicarboxylic acid, succinic acid, adipic acid, azelaic acid, sebacic acid, maleic acid, fumaric acid, glutaric acid and dimerized fatty acids.

8. The method of claim 6, wherein the one or more diols are selected from ethylene glycol, propylene glycol, butylene glycol, 1,4-butanediol, 1,6-hexanediol, neopentyl glycol and dimethylolcyclohexane.

9. The method of claim 1, wherein the one or more trimers of di-isocyanates are selected from trimers of aliphatic di-isocyanates.

10. The method of claim 9, wherein the trimers of aliphatic di-isocyanates are selected from trimers of hexamethylene di-isocyanate, isophorone di-isocyanate and mixtures thereof.

11. The method of claim 1, wherein the cured coating composition has a rain erosion resistance of greater than 300 minutes when tested in accordance with ASTM G73 at 20 to 25° C., using a rain volume of 30 litres/hour, an average water droplet size of 5-6 mm, a specimen spin velocity of 140 m/s, and visual inspection at time intervals of 15 minutes, the erosion resistance corresponding to the time until the substrate is visible through the coating.

12. The method of claim 1, wherein the substrate is a wind turbine rotor blade.

* * * * *